Patented May 2, 1950

2,505,830

UNITED STATES PATENT OFFICE 2,505,830

PRECIPITATION OF OLEFIN-SULFUR DIOXIDE RESINS

Ernest P. Irany, Cranford, N. J., and Herman D. Noether, Kew Gardens, N. Y., assignors to Celanese Corporation of America, a corporation of Delaware No Drawing. Application January 26, 1946, Serial No. 643,832

11 Claims. (Cl. 260—79.3)

This invention relates to an improved process for the precipitation of polysulfone resins, which are formed by reacting an olefinic hydrocarbon with sulfur dioxide, from solutions thereof in sulfur dioxide, and, particularly, from highly viscous solutions of said resins in sulfur dioxide.

An object of this invention is to provide an improved process for precipitating high molecular weight polysulfone resins from sulfur dioxide solutions thereof whereby said precipitated resins are obtained in a fine, easily-handled powder form.

Another object of this invention is the precipitation of high molecular weight polysulfone resins from solutions thereof in sulfur dioxide whereby said resins are obtained in a form substantially free of the sulfur dioxide solvent.

A further object of this invention is the precipitation of the polysulfone resins whereby the precipitated resin obtained requires little or no further purification for use as a molding material.

Other objects of our invention will appear from the following detailed description.

Polysulfone resins which are suitable for use as molding materials may be prepared by reacting sulfur dioxide with unsaturated olefinic hydrocarbons. The reaction may be carried out conveniently by employing an excess of sulfur dioxide, the unreacted excess of sulfur dioxide acting as a solvent for the polysulfone resin formed. By effecting the polymerization at relatively low temperatures, polysulfone resins of increased molecular weight and improved physical and mechanical properties are obtained. Due to the higher molecular weight of these polysulfone resins, even the dilute solutions of said resins, which result on employing a considerable excess of sulfur dioxide as solvent during the polymerization reaction, are extremely viscous. The precipitation and purification of the higher molecular weight polysulfone resin from such highly viscous solutions is a difficult, expensive and complicated process.

The usual methods of precipitating the polysulfone resins involving the addition of the viscous sulfur dioxide solution of the resin to a precipitant such as water or methanol, with strong agitation, is quite unsatisfactory. The high viscosity of the polysulfone resin solution prevents proper precipitation even when the resin solution is initially diluted to several times its original volume by the addition of further quantities of sulfur dioxide prior to adding the resin solution to the precipitant. Moreover, polysulfone resins precipitated from solutions of a viscosity low enough to permit precipitation often retain substantial quantities of sulfur dioxide. Accordingly, an after-treatment or purification step of some kind is necessary to remove the sulfur dioxide retained therein or the precipitated resin may, on standing, form a gel-like rubbery mass which cannot be employed for molding purposes. To purify the same, the resin may be redissolved in a suitable organic solvent and then precipitated from this solution by the use of non-solvents such as alcohols, or ethyl ether, for example. The precipitated resin, in the original crude form, may also be purified by being ground to a fine powder and digested with an organic liquid or a mixture of organic liquids until a moldable resin free of sulfur dioxide is obtained. These purification processes are relatively slow, however, and require several days for the removal of the sulfur dioxide. Furthermore, the organic liquid employed for the purification must then be removed from the resin by drying the latter in a suitable apparatus.

We have now found that the aforementioned and other disadvantages of the prior processes for the precipitation and purification of polysulfone resins from the viscous solutions obtained by reacting an olefinic hydrocarbon with excess sulfur dioxide may be entirely eliminated by an improved precipitation process, and the polysulfone resins obtained in the form of a fine, dense white powder free of sulfur dioxide and capable of being stored without danger of gelation to a rubbery mass. In accordance with the novel process of our invention, the high molecular weight polysulfone resins are precipitated from their solutions in excess sulfur dioxide by adding a weak precipitant to said solution in an amount sufficient either to precipitate the resin or to effect at least a sharp reduction in the viscosity of the sulfur dioxide solution of the resin, followed by the addition of a strong precipitant for the polysulfone resin to the solution or slurry obtained after addition of the weak precipitant. The addition of the strong precipitant effects the complete precipitation of the polysulfone resin and the latter then settles in the form of a fine, powdery precipitate. The precipitate obtained may be easily filtered from the supernatant liquid and dried to a fine, dense, white powder which exhibits no tendency to coalesce on standing due to the fact that the excess sulfur dioxide solvent has been completely removed therefrom.

By the term "weak precipitant," as used above and in the appended claims, we mean to include those organic liquids which can be added to an active solvent for the resin, e. g. sulfur dioxide, in substantial quantities without interfering with the solvent power of the active solvent or causing immediate precipitation of the resin from said active solvent. Among the organic liquids which may be added to the solution in accordance with our novel process, to effect the initial sharp reduction in viscosity or precipitation, are acetone, methyl ethyl ketone, ethyl acetate, butyl acetate, benzene and toluene. By the term "strong precipitant," as used above and in the appended claims, we mean to include those organic liquids which are miscible with the weak precipitant which is first added to the original solution but which do not of themselves have any solvent action on the resin. As examples of strong precipitants which may be employed in accordance with our novel process, there may be mentioned methyl alcohol, ethyl alcohol, ethyl ether, and paraffin hydrocarbons such as pentane and ligroin.

Upon the addition of the strong precipitant to the solution or slurry, the polysulfone resin is completely precipitated and the sulfur dioxide still incorporated in the particles of polysulfone resin is expelled from the resin and from the liquid as well. The removal or separation of the sulfur dioxide from the resin particles may take place either by the process of extracting it by means of a solvent of great affinity for sulfur dioxide as by methanol in the case of polysulfone, or on the other hand by means of an agent that is incorporated with sulfur dioxide and expels it from the mixture by vigorous ebullition as, for example, a paraffinic hydrocarbon such as pentane. This view of the mechanism whereby the desired purification takes place is only a theoretical one and, accordingly, we do not wish to be bound thereby. This apparent incompatibility of the sulfur dioxide with the organic liquids causes the sulfur dioxide to be expelled with vigorous ebullition from the solution upon the addition of the strong precipitant thus yielding a purified resin which is free of sulfur dioxide. The purified polysulfone resin, therefore, will not coalesce to a gel-like rubbery mass on standing nor will it tend to sinter or coalesce on heating until a relatively high temperature, say, 150 to 160° C. is reached.

A plurality of strong precipitants may also be employed to remove the sulfur dioxide completely from the precipitated polysulfone resin prior to filtration. Thus, a weak precipitant may be added to the solution followed by the addition of a strong precipitant to effect the complete precipitation of the polysulfone resin. To the slurry obtained there may then be added a second and different strong precipitant whose degree of incompatibility with the sulfur dioxide is such that it causes the sulfur dioxide remaining to be strongly expelled from the resin. The addition of the first strong precipitant causes the desired precipitation of the resin in a form substantially free of sulfur dioxide while the addition of the second strong precipitant completes the removal of the remaining sulfur dioxide therefrom.

In order further to illustrate our invention, but without being limited thereto, the following examples are given:

*Example I*

Acetone is added slowly to a highly viscous solution in 1200 parts by weight of sulfur dioxide of about 170 parts by weight of a high molecular weight polysulfone resin, formed by the reaction of butene-2 with sulfur dioxide at a relatively low temperature. The acetone addition is accompanied by strong agitation. After the addition of 510 parts by weight of acetone the viscosity of the polysulfone resin solution diminishes rapidly and, upon the addition of another 120 parts by weight of acetone, the polysulfone resin precipitates as a fine, white powder. The liquid and the precipitated resin are strongly agitated by suitable means and then 200 parts by weight of methyl alcohol are gradually added. The powdered polysulfone resin is filtered from the supernatant liquid and is then dried at 85° C. under reduced pressure, say, 20 to 60 mms. of mercury. The resin is obtained in the form of a fine, dense, white powder which may be stored for a considerable period of time without tending to coalesce since the resin is substantially free of sulfur dioxide. Upon heating, no sintering or coalescence of the resin is observed until the resin is raised to a temperature of 150° C.

*Example II*

450 parts by weight of ethyl acetate are added slowly with agitation to a solution of 30 parts by weight of sulfur dioxide-butene-2 polysulfone resin dissolved in 700 parts by weight of liquid sulfur dioxide. The viscosity of the resin solution diminishes considerably as the precipitation point of the resin is approached but no precipitation is effected. With continued stirring, methyl alcohol is then added until the polysulfone resin precipitates as a fine, white powder substantially free from sulfur dioxide. The resin is then filtered from solution. No sintering or coalescence of the resin is observed until the purified resin is heated to a temperature above 150° C.

*Example III*

Ethyl acetate is added to a solution in excess sulfur dioxide of a sulfur dioxide-butene-2 polysulfone resin, the solution being of the concentration described in Example II. With continuous stirring, naphtha is then added to the diluted solution until the polysulfone resin precipitates. The naphtha employed comprises a fraction of paraffin hydrocarbons boiling from about 90 to about 110° C. From 50 to 200 parts by weight of ligroin are then added to the slurry and the latter agitated. Following the addition of ligroin, the precipitated resin is filtered from solution and is obtained in the form of a dense, fine, white powder free of sulfur dioxide and suitable for molding operations.

It is to be understood that the foregoing detailed description is given merely by way of illustration and that many variations may be made therein without departing from the spirit of our invention.

Having described our invention, what we desire to secure by Letters Patent is:

1. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butylacetate, benzene and toluene, to said sulfur dioxide solution of polysulfone resin in an amount sufficient to effect a sharp reduction in the viscosity of the solution and then adding a strong precipitant, selected from the group consisting of methyl alcohol, ethyl alcohol, ethyl ether, pentane and ligroin, to the diluted solution to effect a complete precipitation of the polysulfone resin.

2. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butylacetate, benzene and toluene, to said sulfur dioxide solution of polysulfone resin in an amount sufficient to effect a sharp reduction in the viscosity of the solution, adding a strong precipitant, selected from the group consisting of methyl alcohol, ethyl alcohol, ethyl ether, pentane and ligroin, to the diluted solution to effect a complete precipitation of the polysulfone resin and separating the precipitated resin from solution.

3. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butylacetate, benzene and toluene, to said sulfur dioxide solution of polysulfone resin in an amount sufficient to effect at least a sharp reduction in the viscosity of the solution and then adding a strong precipitant, selected from the group consisting of methyl alcohol, ethyl alcohol, ethyl ether, pentane and ligroin, to the diluted solution to effect a complete precipitation of the polysulfone resin.

4. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butyl acetate, benzene and toluene, to said sulfur dioxide solution of polysulfone resin in an amount sufficient to effect at least a sharp reduction in the viscosity of the solution, adding a strong precipitant, selected from the group consisting of methyl alcohol, ethyl alcohol, ethyl ether, pentane and ligroin, to the diluted solution to effect a complete precipitation of the polysulfone resin and separating the precipitated resin from solution.

5. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butylacetate, benzene and toluene, to said sulfur dioxide solution of polysulfone resin in an amount sufficient to effect an incipient precipitation of the polysulfone resin from solution, adding a strong precipitant, selected from the group consisting of methyl alcohol, ethyl alcohol, ethyl ether, pentane and ligroin, to the diluted solution to effect a complete precipitation of the polysulfone resin and separating the precipitated resin from solution.

6. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butyl acetate, benzene and toluene, to said sulfur dioxide solution of polysulfone resin in an amount sufficient to precipitate the polysulfone resin from solution, and then adding a strong precipitant, selected from the group consisting of methyl alcohol, ethyl alcohol, ethyl ether, pentane and ligroin, to the resin slurry obtained.

7. Process for the recovery of acetone-insoluble polysulfone resins from the sulfur dioxide solutions thereof obtained on reacting an unsaturated olefinic hydrocarbon with excess sulfur dioxide, which comprises adding a weak precipitant, selected from the group consisting of acetone, methyl ethyl ketone, ethyl acetate, butyl acetate, benzene and toluene, to said sulfur dioxide solution of polysulfone resin in an amount sufficient to precipitate the polysulfone resin from solution, adding a strong precipitant, selected from the group consisting of methyl alcohol, ethyl alcohol, ethyl ether, pentane and ligroin, to the resin slurry obtained, and separating the precipitated resin from solution.

8. Process for the recovery of acetone-insoluble polysulfone resins from sulfur dioxide solutions thereof obtained on reacting an unsaturated olefinic hydrocarbon with excess sulfur dioxide, which comprises adding ethyl acetate to said sulfur dioxide solution of polysulfone resin in an amount sufficient to effect at least a sharp reduction in the viscosity of the solution, adding methyl alcohol to the diluted solution to effect a complete precipitation of the polysulfone resin, and separating the precipitated resin from solution.

9. Process for the recovery of acetone-insoluble polysulfone resins from sulfur dioxide solutions thereof obtained on reacting an unsaturated olefinic hydrocarbon with excess sulfur dioxide, which comprises adding acetone to said sulfur dioxide solution of polysulfone resin in an amount sufficient to precipitate the polysulfone resin from solution, adding methyl alcohol to the resin slurry obtained, and separating the precipitated resin from solution.

10. Process for the recovery of sulfur dioxide-butene-2 polysulfone resin from the sulfur dioxide solution thereof obtained on reacting butene-2 with excess sulfur dioxide, which comprises adding ethyl acetate to said sulfur dioxide solution of polysulfone resin in an amount sufficient to effect at least a sharp reduction in the viscosity of the solution, adding methyl alcohol to the diluted solution to effect a complete precipitation of the polysulfone resin, and separating the precipitated resin from solution.

11. Process for the recovery of sulfur dioxide-butene-2 polysulfone resin from the sulfur dioxide solution thereof obtained on reacting butene-2 with excess sulfur dioxide, which comprises adding acetone to said sulfur dioxide solution of polysulfone resin in an amount sufficient to precipitate the polysulfone resin from solution, adding methyl alcohol to the resin slurry obtained, and separating the precipitated resin from solution.

ERNEST P. IRANY.
HERMAN D. NOETHER.

REFERENCES CITED

The following references are of record in the file of this patent:

UNITED STATES PATENTS

| Number | Name | Date |
| --- | --- | --- |
| 2,169,363 | Marvel | Aug. 15, 1939 |
| 2,190,836 | Harmon | Feb. 20, 1940 |
| 2,356,896 | Smith | Aug. 29, 1944 |